Patented June 5, 1928.

1,672,538

UNITED STATES PATENT OFFICE.

IZADOR J. NOVAK, OF BRIDGEPORT, CONNECTICUT, ASSIGNOR TO THE RAYBESTOS COMPANY, OF BRIDGEPORT, CONNECTICUT, A CORPORATION OF CONNECTICUT.

FRICTION ELEMENT.

No Drawing.     Application filed October 21, 1922.  Serial No. 596,155.

This invention relates to improvements in friction elements and refers more particularly to a novel saturant which, when used as a binder for friction elements, results in an improved product having a high coefficient of friction.

Among the salient objects of the invention are to provide a binder for friction elements, such as brake linings and clutch facings, presenting a high coefficient of friction and which is non-inflammable; to provide a new flexible friction element such as brake lining or clutch facing hereinafter described.

Phenol resin when used alone as a binder, in addition to its relatively high cost, presents too low a coefficient of friction for satisfactory use in certain cases.

I have discovered that by the addition of rosin or other varnish gum to the phenol resin, either in alkaline or alcoholic solution, or in practically solid state, the minimum coefficient may be raised substantially above that which results when straight phenol resin is used alone. For example, where in certain cases the brake lining had a coefficient of friction of .09 at 500° to 600° F., using phenol resin alone as a binder, by the present invention under like conditions, the lining had a coefficient of friction as high as .22.

Brake linings made by the present invention are capable of withstanding high temperatures without materiallly lowering the coefficient of friction. In fact as contradicting the teachings of the prior art, such high temperature has little effect on the coefficient of friction of my improved brake lining. As a matter of fact, in some cases the coefficient of friction does not fall below .40 when the lining is heated at such temperatures.

Using water as a solvent, one method of producing the friction elements is as follows: Both the phenol resin and rosin are made into their related sodium compounds which are soluble in water, by a process analogous to that whereby vegetable oils are converted into soap. In other words, the rosin and phenol resin soaps are first formed, and then used as saturants. However, if introduced into the lining by saturation and drying, with no further processing, these soaps will still remain soluble in water, which would be a marked disadvantage as brake lining must be resistant to moist conditions. The soaps are therefore fixed by the action of dilute acid, which transforms them back into their water insoluble condition.

The soluble rosin soap may be formed by boiling powdered rosin in water with about 10% of its weight of caustic soda for about two hours. The saturant may then have the following composition: 15 parts sodium rosinate, 6 parts sodium phenol resinate, 79 parts water.

The woven tape, preferably not rolled, is conducted through the saturating bath at a temperature of about 180° F., more or less, to complete saturation and the excess surface saturant removed by scraping or otherwise. This saturation may take an immersion of two to five minutes depending on the thickness. It may then be immersed in a 10% sulphuric acid solution for three to five minutes, scraped well and dried at 200° to 250° F., until dry. After drying, it is rolled to size, and is ready for use.

It will be readily seen that expensive solvents such as benzol, toluol, gasoline solvent naptha and so on, which are in general use, may if desired, be dispensed with and the use of high temperatures in curing avoided.

An invention may be carried out in which alcohol is used as a solvent. This is a very simple and direct method, but at the present time is more expensive than the method above described where water is used as a solvent. This saturant may have the following composition: 14 parts rosin, 6 parts phenol resin, 80 parts alcohol.

The woven asbestos tape may be rolled to the desired finished size before saturation, passed through a tank containing the saturant at atmospheric temperature, allowing an immersion sufficient to preferably completely saturate the tape, the surface saturant being then removed by scraping. About 40% of saturant may then have been added to the original weight. The saturated lining is then put in an oven maintained at 200° F., more or less, where the solvent alcohol is dried out, leaving a residual saturant consisting of about 8% of a mixture of 7 parts of rosin to 3 parts of phenol resin. The dry lining is then rolled to size in calendar rolls, and is ready for use.

It is understood that by phenolic resin, I indicate those condensation products between phenol or its homologues and aldehyde or aldehyde producing substances such as formaldehyde, furfuraldehyde, hexamethylenetetramine, etc.

By gum, I indicate resinous or oleo-resinous vegetable origin, either fossil resins, such as copal, kauri, etc., or non-fossil resins, such as rosin, Burgundy pitch, shellac, caoutchouc, gutta percha, etc. I also include the rubber substitutes made with sulphur and vegetable oils.

The process of forming the friction elements is the subject of a separate co-pending application, Serial No. 596,152, now issued into United States Patent No. 1,519,322 on December 16th, 1924.

I claim as my invention:

1. As an article of manufacture, a friction element comprising an asbestos base having a binder consisting of an intimate admixture of a phenolic condensation product and a gum, the phenolic condensation product remaining fusible in the product as manufactured.

2. As an article of manufacture, a friction element comprising a woven asbestos base having a binder consisting of an intimate admixture of a phenolic condensation product and a gum, the phenolic condensation product remaining fusible in the product as manufactured.

3. As an article of manufacture, a friction element comprising a woven asbestos base having a binder consisting of an intimate admixture of a phenolic condensation product and a gum, the phenolic condensation product remaining fusible in the product, the proportions being in excess of two parts of gum to one part phenol resin as manufactured.

4. As an article of manufacture, a friction element comprising an asbestos base having a binder consisting of an intimate admixture of a potentially reactive phenolic condensation product and a gum, the binder remaining fusible in the product as manufactured.

IZADOR J. NOVAK.